United States Patent [19]

Agaskar

[11] Patent Number: 5,106,604
[45] Date of Patent: Apr. 21, 1992

[54] USE OF METAL SALTS IN THE SYNTHESIS OF OLIGOMERIC HYDROGENSILSESQUIOXANES VIA HYDROLYSIS/CONDENSATION REACTIONS

[76] Inventor: Pradyot Agaskar, 55 Cliveden Ct., Lawrenceville, N.J. 08648

[21] Appl. No.: 668,032

[22] Filed: Mar. 12, 1991

[51] Int. Cl.⁵ .................... C01B 33/00; C01B 33/04
[52] U.S. Cl. .................................................. 423/325
[58] Field of Search ........................................ 423/325

[56] References Cited

U.S. PATENT DOCUMENTS

| | | | |
|---|---|---|---|
| 3,615,272 | 10/1971 | Collins et al. | 423/325 |
| 4,808,653 | 2/1989 | Haluska et al. | 423/325 X |
| 4,895,914 | 1/1990 | Saitoh et al. | 525/478 |

Primary Examiner—Paul F. Shaver
Attorney, Agent, or Firm—Sheldon H. Parker

[57] ABSTRACT

Hydridospherosiloxanes and soluble hydrogensilsesquioxane resin are produced having the formula $(HSiO_{3/2})_n$, where n is an even integer greater than 8. A biphasic reaction medium is prepared, having a first solvent phase and a second solvent phase. The first solvent phase can contain a hydrocarbon solvent, such as an alcohol. The first solvent phase can be methanol or ethanol. The second solvent phase is a concentrated solution of a metal salt, such as Fe(III) in a polar organic solvent and water. A silicon compound represented by the formula: $HSiX_3$, where X is a group which is hydrolyzable in the solvent of said first solvent phase, is added to the biphasic reaction medium. X can be Cl or $OCH_3$. The first solvent phase is separated from the second solvent phase and then the separated first solvent phase is treated with a metal salt, such as sodium or potassium carbonate. Slow evaporation of the first solvent phase solvent is employed to isolate a mixture of crystals of $(HSiO_{3/2})_8$, and $(HSiO_{3/2})_{10}$. The crystal mixture is washed with a hydrocarbon solvent and crystals of $(HSiO_{3/2})_8$ are isolated.

15 Claims, 1 Drawing Sheet

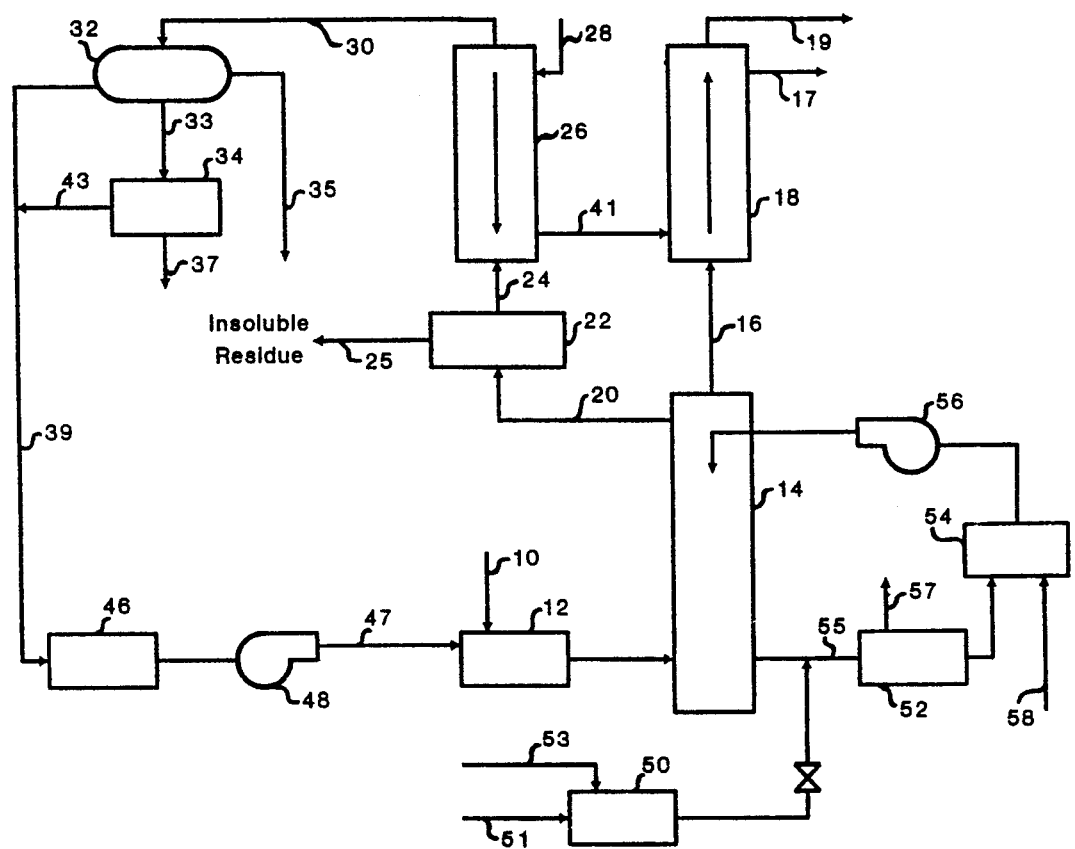

USE OF METAL SALTS IN THE SYNTHESIS OF OLIGOMERIC HYDROGENSILSESQUIOXANES VIA HYDROLYSIS/CONDENSATION REACTIONS

The invention disclosed herein relates to the composition and use of the reaction medium wherein are synthesized compounds with the general formula, $(HSiO_{3/2})_n$, with n being an even number ranging from 8 to a very large number. It also relates to the post-synthesis treatment required for the isolation of, oligomeric hydrogensilsesquioxanes, henceforth referred to as hydridospherosiloxanes, from the abovementioned reaction medium. A byproduct of the operation of this invention is a condensed, soluble resin with the same general formula as the hydridospherosiloxanes The state of the art up to ca. 1980 with regard to the synthesis, properties and uses of the compounds of composition $(HSiO_{3/2})_n$ with $n \geq 8$, generally known in the art by the common name hydrogensilsesquioxanes and abbreviated to $HT_n$, has been summarized in the Gmelin Handbook of Inorganic Chemistry-Si, Supplement Volume B1, pg. 249-251; Publisher Springer-Verlag, Berlin-Heidelberg-New York, 1982. A survey of publications dealing with hydridospherosiloxanes covering the period form 1980 to 1990 shows that the state of the art with regard to the synthesis of the hydridospherosiloxanes has not progressed beyond that described in the publication by C. L. Frye and W. T. Collins in J. Am. Chem. Soc. 1970, 92, 5586-5588 and in U.S. Pat. No. 3,615,272; 1972 assigned to Dow Corning Corporation, Midland, MI, except in the aspects related to post-synthesis separation methodology. However, these publications, which are listed below, reveal a number of potential applications of the hydridospherosiloxanes which clearly establish the utility of the invention disclosed herein. The publication by V. W. Day et al. in J. Am. Chem. Soc. 1985, 107, 8262-8264 reveals that the compound $(HSiO_{3/2})_8$ 1 can be used as a precursor for the synthesis of the compounds $(ClSiO_{3/2})_n$ 2 and $(H_3COSiO_{3/2})_n$ 3. Compound 3 can be used as a molecular building block for the synthesis of ceramic materials. Compound 2 has been used as a surface modification agent by R. Beer et al. as described in J. Electron Spectroscopy and Related Phenomena 1987, 44, 121-130. Compound 1 and $(HSiO_{3/2})_{10}$ 4 have been used as precursors of functionalized spherosilicates, Which have the general formula $[SiO_{2.5}]_n(Si(CH_3)_2Y)_n$ where $n=8$ or 10 and Y may be $-CH_2Cl$ or $-CH=CH_2$, by P. A. Agaskar as described in Synth. React. Inorg. Met.-Org. Chem. 1990, 20, 483-493. The use of these functionalized spherosilicates as precursors of the inorganic/organic hybrid materials called organolithic macromolecular materials (OMM's) is described by P. A. Agaskar in J. Am. Chem. Soc. 1989, 111, 6858. The OMM's can be pyrolysed under $N_2$ and converted to microporous ceramic materials by differential leaching with HF. The hydridospherosiloxanes can also be used directly in a chemical vapor deposition reactor to generate films of $SiO_2$ at low temperatures on substrates that cannot withstand high temperatures. The hydridospherosiloxanes can also be used as precursors of volatile materials that are sensitive to electron beams and hence could be used in a microlithographic process that does not use solvents.

It will be apparent to one skilled in the art that the commercial feasibility of these and other applications of hydridospherosiloxanes depends in the first instance on the availability of an economical method of synthesizing these compounds.

It is the object of the invention, which is the subject of this disclosure, to provide high yields of hydridospherosiloxanes.

A further object of this invention is to provide a method of achieving the aforementioned object, which is economical by virtue of not consuming any organic solvent during the course of its operation and of being eminently amenable to scale-up and continuous operation.

A third object of this invention is to provide the aforementioned two objects concurrent with the production of condensed, soluble hydrogensilsesquioxane resin and the non-production of environmentally damaging byproducts.

Upon consideration of the following specifications and appended claims, it will be apparent to one skilled in the art that these objects along with others not explicitly listed above are provided by the invention disclosed herein.

SUMMARY OF THE INVENTION

It has now been found that hydridospherosiloxanes can be produced economically by a novel process. In accordance with the present invention, hydridospherosiloxanes and soluble hydrogensilsesquioxane resin are produced having the formula $(HSiO_{3/2})_n$, where n is an even integer between 8 and 20.

A biphasic reaction medium is prepared, having a first solvent phase and a second solvent phase. The first solvent phase can contain an aliphatic or aromatic hydrocarbon solvent. The first solvent phase can be hexane or pentane. The second solvent phase is a concentrated solution of a metal salt in a polar organic solvent such as an alcohol and water. The alcohol can be methanol or ethanol. The metal salt can be a salt of Fe(III). A silicon compound represented by the formula: $HSiX_3$, where X is group which is hydrolyzable in the solvent of s id first solvent phase, is added to the biphasic reaction medium. X can be Cl or $OCH_3$. The first solvent phase is separated from the said second solvent phase and then the separated first solvent phase is treated with a metal salt containing carbonate ions, for a time period which is just sufficient to remove by-products. The metal salt is preferably sodium or potassium carbonate or alternatively calcium carbonate. Slow evaporation of the first solvent phase solvent is employed to isolate a mixture of crystals of $(HSiO_{3/2})_8$, and $(HSiO_{3/2})_{10}$. The crystal mixture is washed with a hydrocarbon solvent and crystals of $(HSiO_{3/2})_8$ are isolated.

Hydrochloric acid which is generated is reacted with the residual metal carbonate to form a metal chloride salt. The method is advantageously carried out as a continuous process.

DESCRIPTION OF THE PREFERRED EMBODIMENTS OF THE INVENTION

The procedure which in part and into expresses the invention comprises of the following steps.

a. Preparation of a biphasic reaction medium consisting of a hydrocarbon phase and an immiscible polar phase containing high concentrations of a metal salt, specifically Iron(III) chloride, along with some water, where the molar ratio of water to the metal ion, specifically Fe(III), is less than that required to saturate the available coordination sites on the metal ion, specifically $[H_2O]/[Fe(III)] < 6$, and a solubilising amount of alcohol, specifically methanol.

Addition of a solution of a silicon compound of the type $RSiX_3$ where X is Cl, $OCH_3$ or any easily hydrolyzable group and R is H or any organic group, specifically $HSiCl_3$, dropwise over a period of time with vigorous mixing, to the reaction medium described in part a above.

c. Separation of the two phases after the addition described above in part b and treatment of the hydrocarbon phase with an acid scavenger, specifically a metal salt containing carbonate ion e.g. $K_2CO_3$, and a additionally a dessicant, specifically $CaCl_2$, to aid complete condensation of silanol groups and to protect the desired compounds from the degrading action of water.

d. Redirection of the polar non-hydrocarbon phase leftover after the operations of part c described above towards the operation of part a after making up the losses of water due to incorporation into the desire product.

e. Isolation from the hydrocarbon phase after treatment as described in part c of a mixture of crystals of $HT_8$ and $HT_{10}$ by crystallization induced by slow evaporation of hydrocarbon solvent and isolation of pure $HT_8$ from this mixture by washing with limited amounts of hydrocarbon solvent. Additionally, isolation of the dissolved solid in the mother liquor, which is the condensed soluble hydrogensilsesquioxane resin, by complete removal of hydrocarbon solvent.

f. Destruction of the corrosive hydrochloric acid gas generated as a result of the operation of part b by reaction with the excess of the carbonate ions used in the operations of part c.

g. Redirection of the hydrocarbon solvent vapors generated by the operation of part e after condensation towards reconstitution of the reaction medium prepared as described in part a.

The hydrocarbon solvent used may be any suitable aliphatic or aromatic compound or a mixture of any or all such suitable compounds, the operational definition of 'suitable' in this context involves the favorable combination of three factors.

a. Solubility of the monomeric silicon compounds.

b. Solubility of the product molecular compounds and resin.

c. Stability of the product molecular compounds and resin.

Exemplary of such suitable solvents are pentane, hexane, heptane, cyclohexane, benzene, toluene, xylene. Halogenated solvents such as carbon tetrachloride may also be considered suitable in this context. Though mixtures of solvents can be used, the use of pure solvents is to be preferred in order to facilitate recycling as described in part g of the procedure described above.

The metal salt used in part a of the procedure described above should have a strong affinity for water and should dissolve to a large extent in a polar solvent to form a phase which is immiscible with the hydrocarbon o other suitable phase described in the previous paragraph. The polar solvent used in the examples described below is methanol, however, a large number of alcohols and ethers such as ethanol, isopropanol, glycerol, diethyl ether, tetrahydrofuran, diglyme are obvious alternatives that could be used instead of methanol. The metal salt used in the examples described below is iron(III) chloride, however, iron(III) sulfate, iron(II) chloride, calcium chloride or any of a number of metal salts that function in the manner described at the beginning of this paragraph, are obvious alternatives that could be used instead of iron(III) chloride.

The silicone compound which is used in the examples given below is trichlorosilane, $HSiCl_3$. However, in the presence of alcohols, this may be converted to the alkoxy derivatives, consequently such derivatives may be used directly instead of $HSiCl_3$. The concentration of such monomeric silicon compounds in the solution added to the reaction medium described in part a of the procedure given above, may be varied over a wide range and so can the time over which such addition is carried out. The operative consideration here is the 'high-dilution' principle which states that the formation of highly cyclised materials, such as the hydridospherosiloxanes, is favored by high-dilution of reactants. Lowering the concentration and increasing the time of addition thus favor the formation of hydridospherosiloxanes at the cost of reducing the output per unit time, however, carrying out the procedure in a continuous manner as described below can counteract this unfavorable cost factor, thus enhancing the overall yield of the hydridospherosiloxanes.

Post-reaction treatment with metal salts is a means of rapidly removing several objectionable components from the solvent phase containing the dissolved hydridospherosiloxanes and hydrogensilsesquioxane resin in order to prevent structural degradation of these desirable materials. The objectionable compounds are a) hydrochloric acid b) surfactant molecules, c) suspended metal salt solution d) water. The removal of water also promotes complete condensation of silanol moieties. The metal salts used in the examples give below are potassium carbonate and calcium chloride, however, other suitable salts are sodium carbonate, sodium bicarbonate, calcium carbonate, barium oxide or any other metal salt or combination of metal salts that can achieve the removal of the four undesirable constituents listed above.

The reaction product is a mixture of the hydridospherosiloxanes $HT_8$ and $HT_{10}$, which are volatile molecular compounds with cubic and pentagonal prismatic structures respectively, and condensed soluble hydrogensilsesquioxane resin. The hydridospherosiloxanes $HT_8$ and $HT_{10}$ can be isolated by crystallization or alternatively since they are volatile by sublimation.

Execution of the procedures described above in the several forms described in the examples provided below results in high yields (ca. 25%-36%) of crystals of $HT_8$ and $HT_{10}$ and subsequently of pure $HT_8$ (ca. 13%-23%). In addition high yields (46%-56%) of condensed soluble hydrogensilsesquioxane resin are also obtained.

The procedure may be executed in a batch manner as described in the examples provided below or preferably in a continuous manner. Several features mentioned in the specifications listed above make the procedure especially well-suited for operation in a continuous manner. These features are the ability to reuse the water containing metal salt solution and the possibility of recycling the hydrocarbon solvent which plays only a passive role in the operation of this procedure. Another feature of this procedure that is especially suited for scale-up is the fact that the corrosive byproduct which is HCl, when the readily available trichlorosilane is used, can be converted to environmentally benign metal chloride salts, e.g. KCl by reaction with the carbonate ions used in the operations of part c.

EXAMPLE 1

FeCl$_3$ (anhydrous, 50 g) was taken in a 1L round bottomed flask and concentrated HCl (20 mL) was added followed by CH$_3$OH (40 mL). Hexane (Mixture of isomers, 350 mL) and toluene (50 mL) were then added and the biphasic mixture was stirred by a heavy magnetic stirrer. A solution of HSiCl$_3$ (20 mL, 0.2 mol) in hexane (150 mL) was added dropwise over a period of 9 hours. After an additional 30 minutes of stirring, the upper hexane layer which had a slight yellow color was transferred to another round-bottomed flask along with some suspended yellow solid. K$_2$CO$_3$ (14 g) and CaCl$_2$ (10 g) were added to the flask and the contents stirred overnight. The mixture was filtered and the volume of the colorless filtrate was reduced by evaporation until it was ca. 20 mL. The crystals that were deposited were collected and washed with hexane (ca. 20 mL). The mother liquor and the washings were pooled and the volume reduced by evaporation until it was <10 mL. A second crop of crystals was collected and washed with hexane (ca. 10 mL). The total yield of crystals was 2.88 g. The solid non-crystalline soluble residue weighted 4.9 g.

The crystals were analyzed by $^1$H NMR and shown to be a mixture of HT$_8$ and HT$_{10}$ (ca. 3.5:1). Yield 27.2% based n HSiCl$_3$.

Pure HT$_8$ was isolated (1.85 g, 17.5% yield based on HSiCl$_3$) by washing off the HT$_{10}$ along with some HT$_8$ using hexane (ca. 45 mL).

EXAMPLE 2

The FeCl$_3$ containing layer leftover from Example 1 was taken in a 1L round bottomed, concentrated HCl (5 mL) was added followed by hexane (350 mL) and toluene (50 mL). The biphasic mixture was stirred by a heavy magnetic stirrer and a solution of HSiCl$_3$ (20 mL, 0.2 mol) in hexane (150 mL) was added dropwise over a period of 4.5 hours. After an additional 1 hour of stirring the upper hexane layer was separated and treated as described in Example 1.

Total yield of crystals was 2.67 g. These were a mixture of HT$_8$ and HT$_{10}$ (ca. 4:1) as shown by $^1$H NMR). Yield 25.2% based on HSiCL$_3$.

HT$_8$ was isolated (1.78 g, 16.8% based on HSiCl$_3$) as described in Example 1.

EXAMPLE 3

FeCl$_3$ (anhydrous, 100 g) was taken in a 3-L Norton flask (i.e. an indented round-bottomed flask), concentrated HCl (40 mL) was added followed by CH$_3$OH (80 mL), hexane (500 mL) and toluene (50 mL). The biphasic mixture was stirred vigorously with a mechanical stirrer and a solution of HSiCL$_3$ (40 mL, 0.4 mol) in hexane (200 mL) was added dropwise over a period of 90 minutes. When the addition was complete, the stirring was stopped and the reaction mixture was allowed to separate into two layers. The upper hexane layer was transferred to a 2L round-bottomed flask and K$_2$CO$_3$ (14 g) and CaCl$_2$ (11 g) were added. The mixture was stirred for ca. 270 minutes and filtered. The clear filtrate was reduced in volume by evaporation. The mother liquor (ca. 20 mL) was removed from the crystals (total weight =4.49) which were washed with 10 mL portions of hexane until the weight loss after a wash was only ca. 60 mg.

The residue which weighed 2.75 g was pure HT$_8$. Yield 13% based on HSiCl$_3$.

EXAMPLE 4

Concentrated HCl (10 mL) was added to the spent FeCl$_3$ layer of Example 3. Sodium dodecylsulfate (2.0 g) was then added followed by hexane (800 mL). A solution of HSiCl$_3$ (40 mL, 0.4 mol) in the hexane (200 mL) was added dropwise over a period of 2 hours while the biphasic mixture was being stirred vigorously. After an additional 30 minutes of stirring, the two layers were separated and the hexane layer transferred to a 2L flask containing K$_2$CO$_3$ (21 g) and CaCl$_2$ (14 g). The mixture was stirred overnight and then filtered. Pure HT$_8$ was isolated as described in Example 3.

Weight of HT$_8$ isolated was ca. 3.5 g. Yield ca. 16.% based on HSiCl$_3$.

EXAMPLE 5

FeCl$_3$ (anhydrous, 100 g) was taken in a 3L Norton flask and concentrated HCl (40 mL) was added followed by CH$_3$OH (80 mL), sodium dodecylsulfate (3.0 g) and hexane (800 mL). A solution of HSiCl$_3$ (40 mL, 0.4 mol) in hexane (400 mL) was then added dropwise over a period of 6 hours while the biphasic mixture was being stirred vigorously. After an additional 30 minutes of stirring the two layers were allowed to separate and the upper hexane layer was transferred to a 2L round-bottomed flask. K$_2$CO$_3$ (28 g) and CaCl$_2$ (11 g) were added, the mixture stirred overnight and then filtered. When the solvent was allowed to evaporate from the clear filtrate, a white crystalline precipitate was obtained. The mother liquor (ca. 50 mL) was removed, the crystals washed with hexane (ca. 50 mL) and the washings combined with the mother liquor. The first crop of crystals weight 4.6 g. The volume of the pool mother liquor and washings was reduced to ca. 10 mL by slow evaporation and a second crop of crystals was isolated and washed with hexane (ca. 10 mL). Combined weight of crystals was 5.7 g. The soluble residue weighted 12.0 g after all solvent was removed.

The crystals were washed with hexane (10 mL portions) until the weight loss associated with the washing was ca. 60 mg. The residue which weighed 3.57 g was pure HT8. Yield based on HSiCl$_3$ was 17.7%. The rest of the crystalline product was a mixture of HT$_8$ and HT$_{10}$ (ca. 1:2). Total yield 26.9%.

EXAMPLE 6 n-Pentane (700 mL) was added to the spent FeCl$_3$ layer of Example 5. A solution of HSiCl$_3$ (17 mL, ~0.17 mol) inn-pentane (300 mL) was added over a period of 4 hours. After the stirring was stopped the upper pentane layer was transferred to a 2L round-bottomed flask and treated with Na$_2$CO$_3$ (50 g). After stirring overnight the mixture was filtered and dealt with as detailed in Example 5. Combined weight of HT$_8$ and HT$_{10}$ crystals was 3.03 g. Yield based on HSiCL$_3$ 45.6%. Pure HT8 (1.95 g) was isolated in 22.9% yield based on HSiCl$_3$.

As illustrated in the Figure, the method of the instant invention, can be carried out in a continuous mode.

Continuous Process

A feed stream 10, of HSiCl$_3$ is supplied to a mixer 12 and then to the lower end of counter current mixer/agitator 14. Gaseous HCl is removed from the agitator 14 via line 16 and delivered to a column 18. Line 17 delivers CO$_2$ from the top of the column 18 while line 19 carries CaCl$_2$. Bottoms from the downflow column 26 is delivered via line 41 to the upflow column 18. A second effluent stream 20 is passed through a filter 22, and delivered, via line 24, to the column 26. Insoluble residue is removed from the system by means of the filter 22, and disposed of via line 25. The metal salt calcium carbonate is delivered to the column 26 via line 28. Effluent is removed from the column 26 via line 30 and delivered to an evaporative concentrator crystallizer 32. A first product stream 35 contains a mixture of $(HSiO_{3/2})_8$ and $(HSiO_{3/2})_{10}$. A second product stream 33 feeds to an evaporator 34 and then to an outlet stream 37, which contains $(HSiO_{3/2})_n$, where n is at least 12 and up to about 20. The line 43 delivers $C_5H_{12}$ from the evaporator 34 to the line 39 which feeds to the condenser 46.

$C_5H_{12}$ can be added via line 47 to the stream being fed from the pump 48 to the mixer 12.

$FeCl_3$ and $CH_3OH$ are feed to mixer 50, via feed line 51 and 53 respectively. The mixed feed of $FeCl_3$ in the solvent $CH_3OH$ is added, as required, to the $FeCl_3$ stream 55. The filter 52 removes insoluble residue 57 from the $FeCl_3$ feed stream. Water line 58, delivers water to the mixer 54, where it is mixed with the $FeCl_3$ and then pumped by pump 56 to the top of the counter current mixer/agitator 14. The examples given above are considered to be illustrative of the invention and are not to be construed as unduly limiting the invention which is properly set forth in the claims listed below.

What is claimed is:

1. Method of producing hydridospherosiloxanes, comprising the steps of:
   a preparing a biphasic reaction medium having a first solvent phase and a second solvent phase, said second solvent phase comprising a concentrated solution of a metal salt in a polar organic solvent and water;
   b adding to the biphasic reaction medium of step a), a silicon compound represented by the formula: $HSiX_3$, where X is a group which is hydrolyzable in the solvent of said first solvent phase;
   c separating said first solvent phase from said second solvent
   d treating said separated first solvent phase with a metal salt containing carbonate ions, for a time period which is just sufficient to remove by-products;
   e isolating a mixture of crystals of $(HSiO_{3/2})_8$, and $(HSiO_{3/2})_{10}$ by the slow evaporation of said first solvent phase solvent; and
   f washing said mixture of step e) with a hydrocarbon solvent and isolating crystals of $(HSiO_{3/2})_8$.

2. The method of claim 1, wherein said first solvent phase contains a hydrocarbon solvent.

3. The method of claim 1, wherein the solvent of said first solvent phase is an aliphatic or aromatic hydrocarbon.

4. The method of claim 1, wherein the solvent of said second solvent phase is methanol or ethanol.

5. The method of claim 1, wherein said metal salt is a salt of Fe(III).

6. The method of claim 5, wherein the molar ratio of water to Fe(III), in step a) is less than 6.

7. The method of claim 1, wherein X is Cl or $OCH_3$.

8. The method of claim 7, wherein X is Cl.

9. The method of claim 1, wherein said metal salt is sodium or potassium carbonate.

10. The method of claim 2, further comprising repeating the sequence of steps a) through e), in step e) recovering solvent, and wherein said hydrocarbon solvent of each successive step a) is said recovered solvent of the prior step e).

11. The method of claim 8, wherein hydrochloric acid is generated in step b), said hydrochloric acid is reacted with the residual metal carbonate of step d) to form a metal chloride salt.

12. The method of claim 11, wherein the metal salt of step d) is sodium and the metal chloride is NaCl.

13. The method of claim 1, wherein condensed, soluble hydrogensilsesquioxane resin, having the formula $(HSiO_{3/2})_n$, where n is an even integer greater than 8, is produced.

14. The method of claim 1, wherein said method is carried out as a continuous process.

15. Method of producing hydridospherosiloxanes in a continuous process, comprising the steps of:
   preparing a biphasic reaction medium having a first solvent phase and a second solvent phase, said second solvent phase comprising a concentrated solution of a metal salt in a polar organic solvent and water;
   b adding to the biphasic reaction medium of step a), a silicon compound represented by the formula: $HSiX_3$, where X is group which is hydrolyzable in the solvent of solvent of said first solvent phase;
   c separating said first solvent phase from said second solvent phase;
   d treating said separated first solvent phase with a metal salt containing carbonate ions, for a time period which is just sufficient to remove by-products;
   e isolating a mixture of crystals of $(HSiO_{3/2})_8$, and $(HSiO_{3/2})_{10}$ by the slow evaporation of said first solvent phase solvent; and
   f washing said mixture of step e) with a hydrocarbon solvent and isolating crystals of $(HSiO_{3/2})_8$.

* * * * *

UNITED STATES PATENT AND TRADEMARK OFFICE
CERTIFICATE OF CORRECTION

PATENT NO. : 5,106,604

DATED : Apr. 21, 1992

INVENTOR(S) : Pradyot Agaskar

It is certified that error appears in the above-identified patent and that said Letters Patent is hereby corrected as shown below:

Column 1, line 20, delete "$n_{\geq}$" and insert therefor -- $n \geq$ --;

Column 2, line 41, delete "s id" and insert therefor -- said --;

Column 3, line 2, delete "<6" and insert therefor -- $\leq 6$ --;

Column 5, line 1, delete "IL" and insert therefor -- 1L --;

Column 5, line 34, delete "IL" and insert therefor -- 1L --;

Column 5, line 43, delete "HT8" and insert therefor -- $HT_8$ --;

Column 6, line 50, delete "inn-pentane" and insert therefor -- n-pentane --;

Column 6, line 57, delete "HT8" and insert therefor -- $HT_8$ --;

UNITED STATES PATENT AND TRADEMARK OFFICE
CERTIFICATE OF CORRECTION

PATENT NO. : 5,106,604

DATED : Apr. 21, 1992

INVENTOR(S) : Pradyot Agaskar

It is certified that error appears in the above-identified patent and that said Letters Patent is hereby corrected as shown below:

Column 7, line 39, delete "HSiX3" and insert therefor -- $HSiX_3$ --

Signed and Sealed this

Eighth Day of September, 1992

Attest:

DOUGLAS B. COMER

Attesting Officer

Acting Commissioner of Patents and Trademarks